Figure 1:
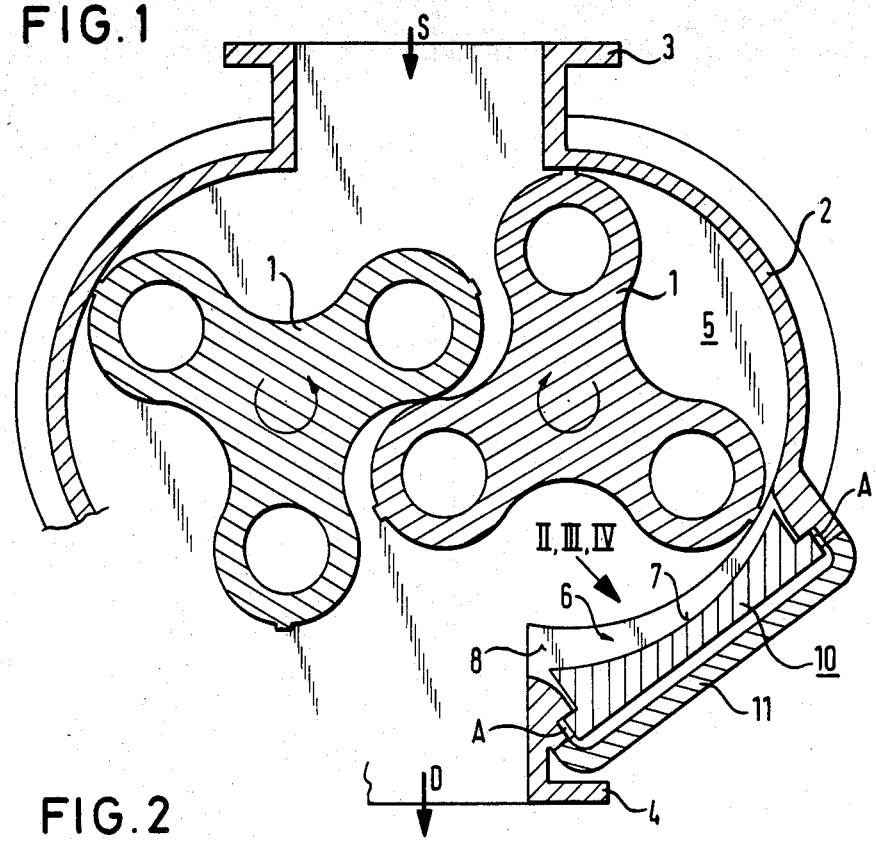

United States Patent [19]

Nissen

[11] Patent Number: 4,652,223

[45] Date of Patent: Mar. 24, 1987

[54] ROOTS COMPRESSOR FOR COMPRESSING OF GASEOUS MEDIA

[75] Inventor: Hans Nissen, Aerzen, Fed. Rep. of Germany

[73] Assignee: Aerzener Maschinenfabrik GmbH, Aerzen, Fed. Rep. of Germany

[21] Appl. No.: 721,694

[22] Filed: Apr. 10, 1985

[30] Foreign Application Priority Data

Apr. 13, 1984 [DE] Fed. Rep. of Germany ....... 3414039

[51] Int. Cl.$^4$ ............................................. F01C 1/02
[52] U.S. Cl. .................................................. 418/206
[58] Field of Search ............... 418/206, 140, 189, 190, 418/252

[56] References Cited

U.S. PATENT DOCUMENTS

| | | | |
|---|---|---|---|
| 629,796 | 8/1899 | Lobee | 418/252 |
| 2,463,080 | 3/1949 | Beier | 418/206 |
| 3,667,874 | 6/1972 | Weatherston | 418/206 |
| 3,844,695 | 10/1974 | Weatherston | 418/206 |
| 4,215,977 | 8/1980 | Weatherston | 418/206 |

Primary Examiner—Carlton R. Croyle
Assistant Examiner—Jane E. Obee
Attorney, Agent, or Firm—Hopgood, Calimafde, Kalil, Blaustein & Judlowe

[57] ABSTRACT

In a roots compressor for compressing of gaseous media, in which alternately in the delivery chambers formed in each case from the respective Roots pistons and the associated delivery space walls of the cylinder and the end side plates, after closure of the suction side, delivery medium is fed in from the delivery side via channels in the cylinder surfaces, the base surface and the side surfaces of the channels are incorporated at least partially in an insert which is releasably secured in a recess in the cylinder wall.

9 Claims, 9 Drawing Figures

ROOTS COMPRESSOR FOR COMPRESSING OF GASEOUS MEDIA

The invention relates to a Roots compressor for compressing of a gaseous medium wherein after closure of the suction side the medium is fed alternately via channels in the cylinder surfaces from the delivery side into the delivery chambers formed by the respective Roots pistons and the associated delivery space walls of the cylinder and the end plates, and wherein the base surface and side surfaces of each channel together with the respective piston form in each position of the piston a predetermined delivery area corresponding to the necessary delivery characteristic.

In general, with Roots compressors there exists the problem that a proportion of the already compressed medium is returned into the delivery chamber when the delivery chamber is opened to the delivery side. This flow reversal leads to the appearance of strong oscillations both in or on the Roots compressor and also in the subsequently connected pipe system on the delivery side.

It is true that it has already been attempted to prevent the occurrence of these oscillations by feeding delivery medium from the delivery side into the delivery chambers before their opening to the delivery side (cf. for example DE-PS No. 11 33 500, DE-AS No. 12 58 543; Bulletin of JSME, Vol. 24, No. 189, March 1981, pages 547 to 554). As a result of these suggested measures, however, back flow of the medium from the delivery side into the delivery chamber cannot be completely prevented so that with these known proposals it is only possible to reduce the appearance of oscillations.

Furthermore, it is already known from U.S. Pat. No. 4,215,977 that the pulsations or oscillations occurring in the delivery side supply conduit in the compression of gaseous media by Roots compressors can be reduced still further if before supply into the delivery conduit the proportion of the delivered medium necessary in each case for compression is continuously uniformly removed from the delivery medium supplied on the delivery side. This further reduction is only possible with a known compressor of this type however if the operational conditions are maintained extremely exactly, which is predominantly not the case in practice. Subsequent adaption to the operational conditions present in practice is however not possible with a compressor of this type.

In order now to enable subsequent adaption to the operational conditions occurring in practice, it has already been suggested to insert strip-like insertion plates into the openings of the front surfaces of the delivery chamber, whereby in a simple manner it is achieved that whilst retaining the output characteristic established by the rotation angle in dependence upon the insertion depth of the adjusting plate, modification of the instantaneous output surface function can be continuously achieved.

By this means, one and the same machine can be adapted to various operational conditions without great technical effort and without extensive conversion work. This is particularly of significance if adaption of the compressor to the special conditions of the user is necessary, because the theoretical data do not correspond with the operational data, as often happens in practice.

Now in many practical situations it is not necessary to carry out the modification of the instantaneous delivery surface function continuously, i.e. steplessly, especially since the technical effort for this is not inconsiderable.

An object of the present invention is therefore to find a new solution with which on the one hand the principal advantages of the last-mentioned known solution can be retained and on the other hand however the technical effort is reduced.

This object is achieved according to the invention in that the base surfaces and the side surfaces of each channel are at least partially formed by an insert which is releasably secured in a recess in the cylinder wall.

By this construction according to the invention, the entire technical expenditure for the mechanism for stepless adjustment of the setting plate is avoided. Furthermore, it is unnecessary to provide space in the side plate area for receiving the part of the setting plate extending out across the cylinder ends.

In this connection, from the functional standpoint, it is unnecessary to accept a disadvantage since the inserts for the recesses can be made available in the smallest size graduations.

By means of the concept according to the invention it is possible to equip a Roots compressor of a certain size with standard recesses in which then the respective inserts adapted to the operational situation can be arranged. The inserts can if necessary be combined in the form of an assembly from two or more parts.

Basically, it is possible to secure the inserts rigidly or movable to a limited extent in the recesses. Where the inserts are arranged rigidly in the recesses, an absolutely operationally reliable construction is achieved. In contrast, if the inserts are secured to be movable within limits in the recesses, in addition fine adjustment is possible within certain boundaries.

Basically, the recesses can be constructed in various manners. It is however particularly advantageous to construct the recesses in each case as passages extending to the outer side of the compressor, since in this manner simple loading with inserts is possible without the necessity for removal of large numbers of machine parts. This proves advantageous particularly in the adaption of such Roots compressors at the place of installation.

In those cases in which the recesses are constructed as passages opened to the outer side of the compressor, it is advantageous to close these on the outer side of the compressor with a cover. In this manner, the sealing necessary for operation need not be provided directly in the region of the inserts, which is technically relatively expensive. On the contrary, the sealing can be provided in the region of the plane between the cylinder and the cover in which an absolutely safe sealing is possible with the usual technical means in a simple manner.

Basically, it is possible to form the recesses as pockets open to the end plates. Such a construction is particularly expedient if it is intended to arrange the overall concept in such manner that as few places as possible are present in which poor sealing can occur such as for example is required with gas-tight blowers or with blowers operating in the vacuum region.

In order to avoid adjustment work in the positional fixing of the inserts in the recesses, passages or pockets, it is advantageous to provide stops, guides or the like for the inserts and to equip these with appropriate counter stops or the like.

The channels in the inserts can be constructed according to the invention in such manner that considered in the direction of rotation of the piston the width of the basic surface is constant and the height of the side surfaces reduces, the height of the side surfaces is constant and the breadth of the base surface reduces or the width of the base surface and the height of the side surfaces are each of varying values.

This construction can be selected according to the respective circumstances, the respective desired form being machined from a unitary base body by means of a template.

Figure 2:
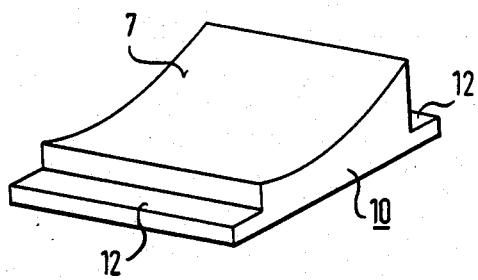
Figure 3:
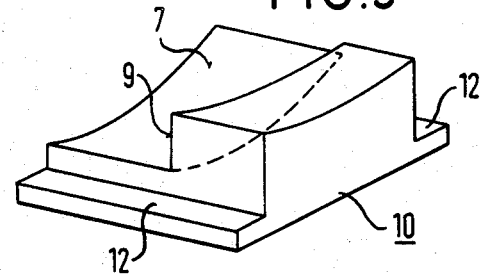
Figure 4:
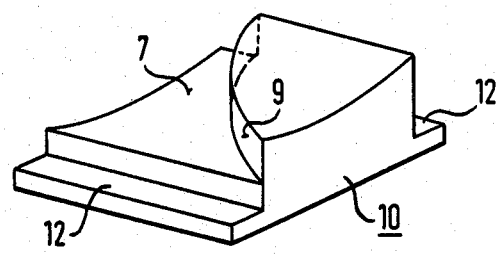
Figure 5:
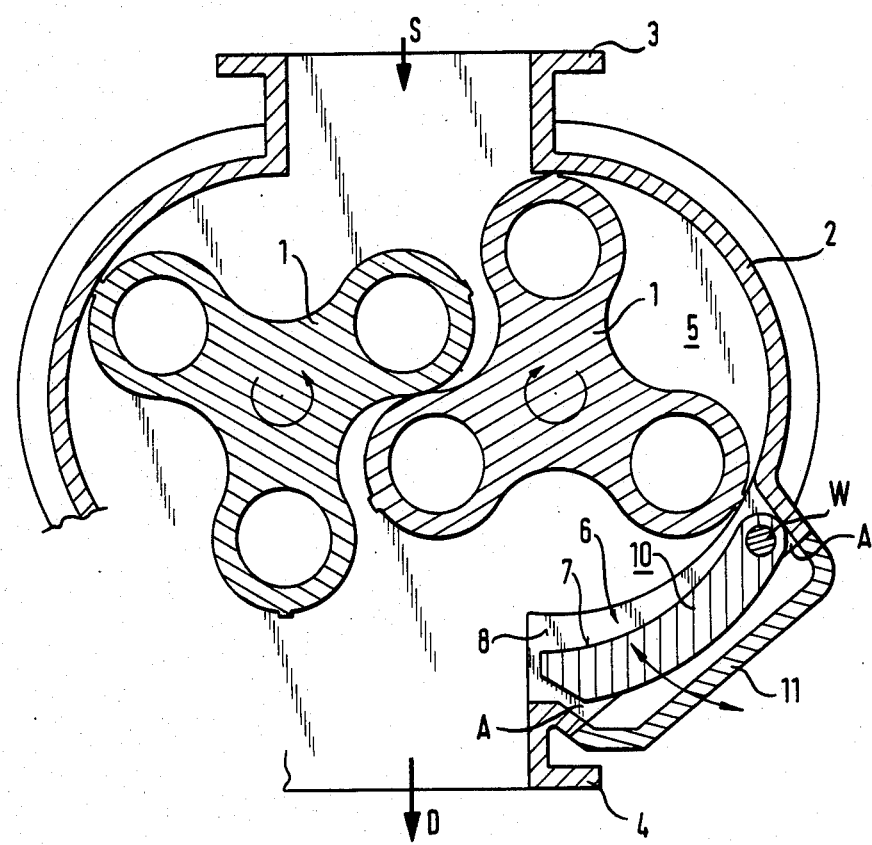
Figure 6:
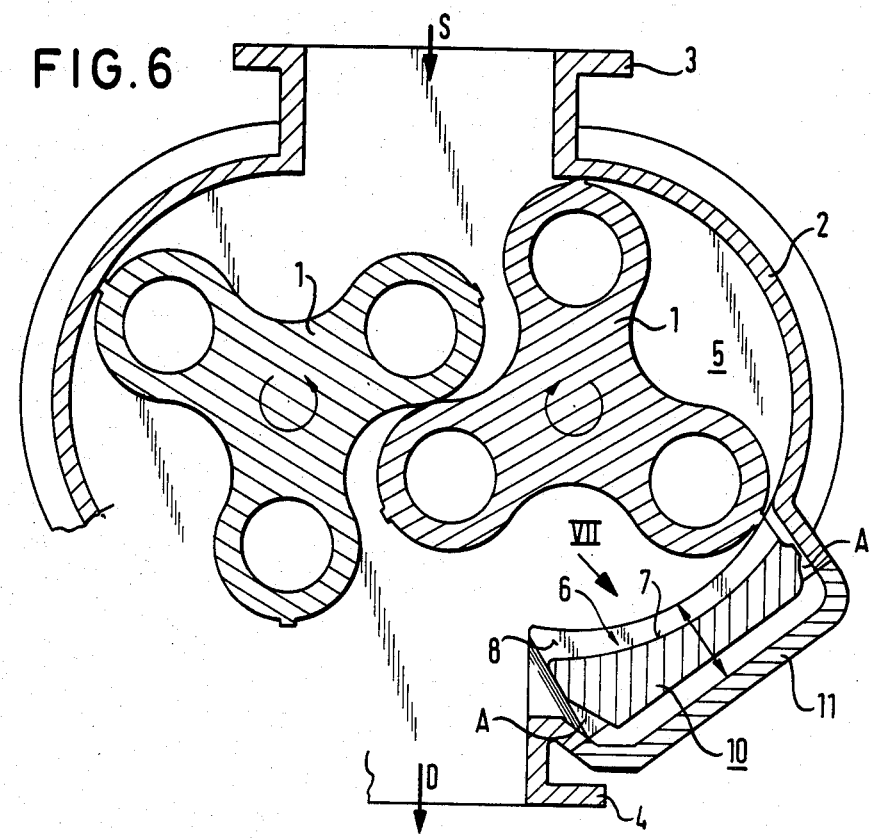
Figure 7:
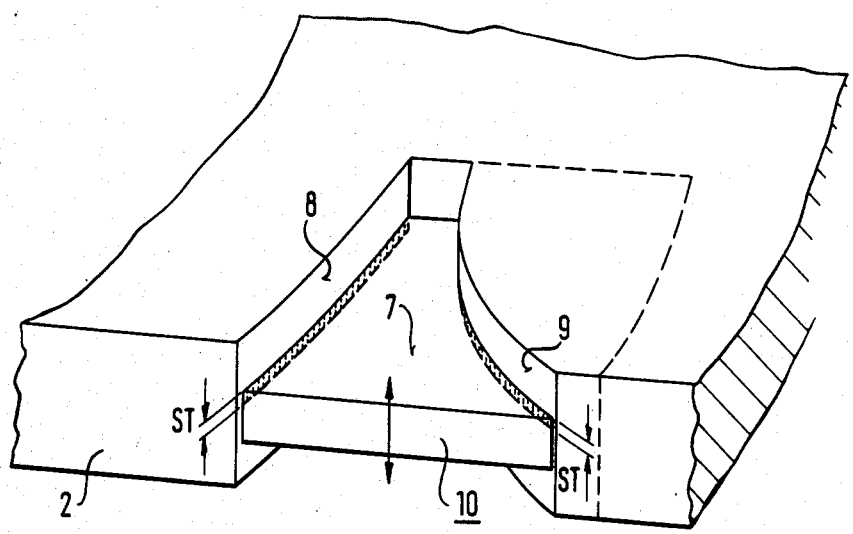
Figure 8:
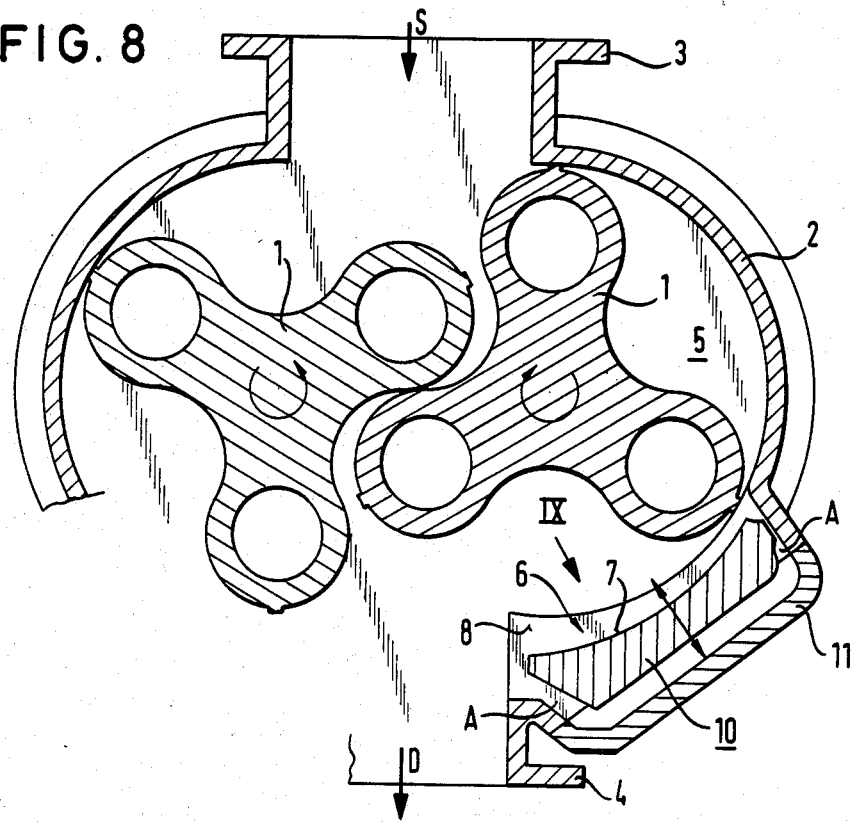
Figure 9:
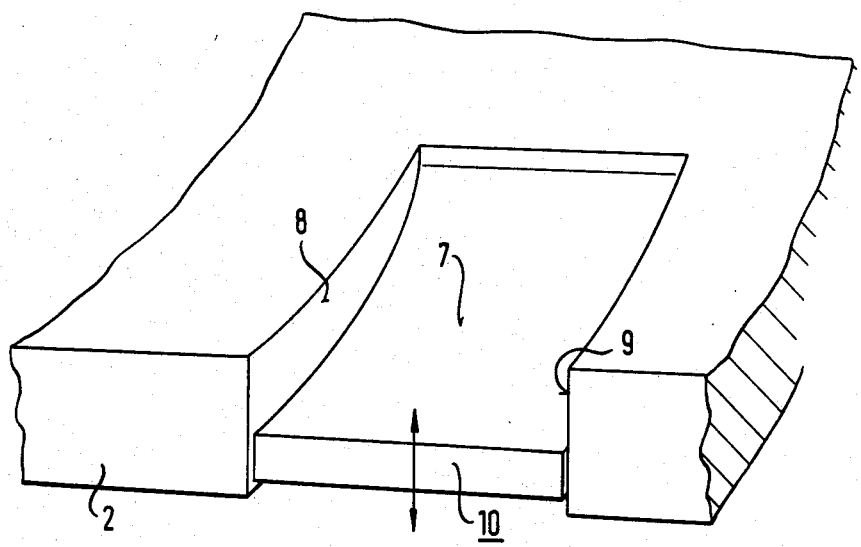

In the following, for further explanation and better understanding of the invention six exemplary embodiments are described in more detail with reference to the accompanying drawings, in which FIG. 1 shows schematically and partially broken away a cross-section through a Roots compressor of the type according to the invention in the region of the recess in which an insert is releasably secured;

FIGS. 2, 3 and 4 show in perspective view at an enlarged scale three exemplary embodiments of immovable inserts taken along the direction of the arrow II, III and IV respectively of FIG. 1;

FIGS. 5, 6 and 8 respectively show three exemplary embodiments in cross-section corresponding to that in FIG. 1 and having inserts having limited movement;

FIG. 7 shows a perspective view at an enlarged scale of the exemplary embodiment according to FIG. 6 along the direction of the arrow VII in FIG. 6; and FIG. 9 shows a perspective view at an enlarged scale of the exemplary embodiment according to FIG. 8 taken along the direction of the arrow IX in FIG. 8.

The Roots compressors schematically illustrated in FIGS. 1, 5, 6 and 8 have two mutually cooperating Roots pistons 1 in known manner which are mounted in a cylinder 2. The cylinder 2 is closed in known manner in the region of its front sides with side plates (not shown in the Figures) and in each case is provided with a suction inlet 3 and a delivery outlet 4 which in each case define the suction side S and the delivery side D.

In Roots compressors of this type delivery medium is fed from the delivery side D via channels 6 alternately in the delivery chambers 5 formed from respective Roots pistons 1 and the associated delivery space walls of the cylinder 2 and the end side plates, after closing off of the suction side S. Concerning the type and manner of this feeding and the advantages achieved thereby reference is made to the explanation in U.S. patent application Ser. No. 539,126, filed Oct. 5, 1983, now abandoned, which was based on German Patent Application No. DE-A-3 238 015.1 of record in said abandoned file.

These channels 6 are formed from a base surface 7 and side surfaces 8 and 9 which according to the invention are incorporated at least partially in an insert 10 which is secured releasably in a recess A in the wall of the cylinder 2.

In the exemplary embodiments illustrated in FIGS. 1, 5, 6 and 8, the recess A is in each case constructed as a passage open to the outer side of the compressor, which is closable by means of a cover 11.

For positional fixing of the inserts 10 in the recesses A, on the inserts stops 12 are provided in the form of guide rails which in the installed condition abut corresponding surfaces of the cylinder 2. The means necessary for securing the inserts 10 in the recesses A are not illustrated in the drawings for the sake of improved clarity.

FIGS. 2, 3 and 4 show which differing forms the inserts 10 can have in the region of their upper side forming the channels 6.

Thus, in the case of the insert according to FIG. 2 only the base surface 7 of the channel 6 is formed by its upper surface, whilst the side surfaces 8 and 9 are formed from surfaces of the cylinder 2 adjoining the insert 10.

In the case of the exemplary embodiment according to FIGS. 3 and 4 on the other hand, the inserts carry in each case the base surface 7 and one of the side surfaces 9 of the channel 6. The other side surface 8 is in turn formed by the surface of the cylinder 2 adjoining the base surface 7 as may be seen from FIG. 1.

In the examplary embodiment illustrated in FIG. 5, the insert 10 is pivotally mounted in the region of its end facing away from the delivery side D about an axis W extending parallel to the axis of the roots piston, as is indicated in FIG. 5 with a double arrow. Also in this version, the upper surface of the insert 10 forms only the base surface 7 whilst the side surfaces 8 and 9 of the channel 6 are formed by the surfaces of the cylinder 2 adjoining the insert laterally.

In the exemplary embodiments illustrated in FIGS. 6 to 9, the movable insert 10 is displaceably mounted substantially radially in the recess A. Also in these exemplary embodiments, the upper side of the insert 10 forms only the base surface of the channel 6 in each case, whilst the side surfaces 8 and 9 of the channel are formed by the adjoining surfaces of the cylinder 2.

Since the guidance and adjusting means for the radially displaceably mounted inserts 10 can be arranged in various ways, representation of this has been omitted from the drawings.

The side surfaces of the inserts 10 facing towards the side surfaces 8 and 9 can be processed across their entire height. It is however advantageous, as schematically illustrated in FIG. 7, to process only a narrow strip ST as a guidance or sealing surface and to set back the adjoining part of the side surfaces of the insert.

I claim:

1. A roots type compressor for compressing a gaseous medium comprising in combination two plural-lobe counter-rotating impellers mounted within a cylindrical housing closed by end walls at both ends, said housing having an inlet opening on one side and an outlet opening on the opposite side, and feedback channels formed in said housing extending a predetermined distance in opposite directions circumferentially from said outlet opening in direct communication with said outlet opening to feed said gaseous medium back from said outlet opening to respective chambers that are formed successively between each said impeller and the adjacent housing during impeller rotation, wherein each of said feedback channels has its effective cross-section defined at least in part by a replaceable insert disposed within a corresponding cavity in a wall of said cylindrical housing.

2. A roots type compressor according to claim 1, wherein said insert is moveably mounted within the corresponding cavity for adjustably varying said effective cross-section.

3. A roots type compressor according to claim 1, wherein a separate opening in the wall of said housing communicates with each said cavity and through which said insert can pass for installation and selectable replacement.

4. A roots type compressor according to claim 3, wherein a removable cover closes each of said separate openings in the wall of said housing.

5. A roots type compressor according to claim 1, wherein each of said feedback channels has a cross-sectional area that increases along said channel in the direction toward said outlet opening, and said insert has shape and dimension for determining said cross-sectional area.

6. A roots type compressor according to claim 5, wherein said insert in the direction facing the adjacent impeller has a thickness dimension that varies continuously from a thicker side positionable upstream within said cavity and a thinner side positionable downstream closest to said outlet opening.

7. A roots type compressor according to claim 5, wherein said insert in the direction facing the adjacent impeller has two different surfaces, one surface providing a continuation of the inner cylindrical surface of said housing for reducing the cross-sectional area of said feedback channel, and the other surface being stepped below said one surface for determining said cross-sectional area of said feedback channel.

8. A roots type compressor according to claim 7, wherein said other surface has a uniform dimension in a direction parallel to the axis of rotation of said impellers throughout the length of the channel determined thereby, and said other surface recedes from the level of said one surface by an amount that increases from the upstream to the downstream side of said insert.

9. A roots type compressor according to claim 7, wherein said other surface is recessed below the level of said one surface by a uniform distance throughout the length of the channel determined thereby, and said other surface has a dimension in a direction parallel to the axis of rotation of said impellers that increases from the upstream to the downstream side of said insert throughout the length of the channel determined thereby.

* * * * *